United States Patent
Netz et al.

(10) Patent No.: US 12,007,545 B2
(45) Date of Patent: Jun. 11, 2024

(54) LIGHT SHEET MICROSCOPE AND METHOD FOR LIGHT SHEET MICROSCOPY

(71) Applicant: Carl Zeiss Microscopy GmbH, Jena (DE)

(72) Inventors: Ralf Netz, Jena (DE); Joerg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 105 days.

(21) Appl. No.: 17/513,833

(22) Filed: Oct. 28, 2021

(65) Prior Publication Data
US 2022/0137382 A1 May 5, 2022

(30) Foreign Application Priority Data
Oct. 29, 2020 (DE) .................... 102020128524.8

(51) Int. Cl.
G02B 21/00 (2006.01)
G02B 21/26 (2006.01)
G02B 21/36 (2006.01)
H04N 23/74 (2023.01)

(52) U.S. Cl.
CPC ....... *G02B 21/008* (2013.01); *G02B 21/0032* (2013.01); *G02B 21/26* (2013.01); *G02B 21/365* (2013.01); *H04N 23/74* (2023.01)

(58) Field of Classification Search
CPC .. G02B 21/0032; G02B 21/008; G02B 21/26; G02B 21/365; H04N 23/74
USPC ........................................................ 348/79
See application file for complete search history.

(56) References Cited

U.S. PATENT DOCUMENTS

| | | |
|---|---|---|
| 2006/0033987 A1 | 2/2006 | Stelzer et al. |
| 2010/0265575 A1 | 10/2010 | Lippert et al. |
| 2011/0261446 A1 | 10/2011 | Dunsby |
| 2013/0286181 A1 | 10/2013 | Betzig et al. |
| 2015/0168706 A1* | 6/2015 | Schweinitzer ....... G02B 21/367 348/80 |
| 2015/0168732 A1 | 6/2015 | Singer et al. |
| 2016/0154236 A1 | 6/2016 | Siebenmorgen et al. |

(Continued)

FOREIGN PATENT DOCUMENTS

DE 102017116380 B3 * 12/2018 ......... G02B 21/0032
JP 2020076857 A 5/2020

*Primary Examiner* — Kathleen M Walsh
(74) *Attorney, Agent, or Firm* — Skaar Ulbrich Macari, P.A.

(57) ABSTRACT

In a light sheet microscope, a detection device images a sample volume and an illumination device illuminates the sample with a light sheet. A light sheet plane is arranged substantially perpendicularly to the optical imaging axis and an illumination width extends perpendicular to the light sheet plane. A processing device is provided to control setting of the location of the light sheet plane in the sample volume, and recording a plurality of images of the sample volume with different locations of the light sheet plane. For the plurality of images recorded, a spacing, which is measured along the optical imaging axis, between adjacent locations of the light sheet plane is greater than or equal to half the illumination width, but not greater than the illumination width. Intermediate images for the stack of images in additional locations of the light sheet plane in the sample volume are computed.

9 Claims, 3 Drawing Sheets

(56) References Cited

U.S. PATENT DOCUMENTS

| | | |
|---|---|---|
| 2016/0170195 A1 | 6/2016 | Siebenmorgen et al. |
| 2016/0291304 A1 | 10/2016 | Singer et al. |
| 2018/0074305 A1* | 3/2018 | Atzler ................. G02B 21/365 |
| 2018/0088308 A1* | 3/2018 | Liu ..................... G02B 21/367 |
| 2018/0203217 A1* | 7/2018 | Knebel ................ G02B 21/006 |
| 2018/0321479 A1* | 11/2018 | Landry .............. G01N 21/6458 |
| 2019/0049711 A1 | 2/2019 | Schumann |
| 2019/0113423 A1* | 4/2019 | Goodman ............ G06V 20/698 |
| 2019/0170646 A1* | 6/2019 | Fiolka ................ G02B 21/0076 |
| 2019/0170995 A1 | 6/2019 | Siebenmorgen et al. |
| 2019/0219811 A1* | 7/2019 | Keller ................... G02B 21/32 |
| 2019/0353884 A1* | 11/2019 | Hedde ................ G01N 21/6458 |
| 2019/0353885 A1 | 11/2019 | Siebenmorgen |
| 2020/0096754 A1* | 3/2020 | Brinkman .............. G02B 21/06 |
| 2020/0150043 A1 | 5/2020 | Kleppe et al. |
| 2020/0218047 A1 | 7/2020 | Kleppe et al. |
| 2022/0198611 A1* | 6/2022 | Jia ......................... H04N 23/80 |
| 2022/0390730 A1* | 12/2022 | Schumann ........... G02B 21/367 |
| 2023/0138764 A1* | 5/2023 | Truong .............. G02B 21/0032 |
| | | 359/374 |

* cited by examiner

LIGHT SHEET MICROSCOPE AND METHOD FOR LIGHT SHEET MICROSCOPY

PRIORITY

This application claims the benefit of German Patent Application No. 102020128524.8, filed Oct. 29, 2020, which is hereby incorporated herein by reference in its entirety.

FIELD

The present invention relates to a light sheet microscope and method of light sheet microscopy.

BACKGROUND

The invention relates to a light sheet microscope comprising a sample volume with a sample stage for a sample carrier with a sample. Furthermore, the light sheet microscope comprises a detection device for imaging the sample volume along an optical imaging axis. The light sheet microscope additionally comprises an illumination device for illuminating the sample with a light sheet, characterized by a light sheet plane that is adjustable in the sample volume. The light sheet plane is oriented substantially perpendicularly to the optical imaging axis, and the light sheet has an illumination width b perpendicular to the light sheet plane. The light sheet microscope further comprises a processing device, which is connected to the detection device and to the illumination device and/or the sample stage. The processing device controls the illumination device and/or the sample stage for setting the location of the light sheet plane in the sample volume. The processing device is configured to control the detection device to record a plurality of images of the sample volume with different locations of the light sheet plane, with the result that a z-stack consisting of a plurality of images of the sample volume is produced.

The invention further relates to a method of light sheet microscopy, in which, in a first step, a sample is illuminated with a light sheet. The light sheet is characterized by a light sheet plane, wherein the light sheet plane is arranged substantially perpendicularly to an optical imaging axis and the light sheet has an illumination width b perpendicular to the light sheet plane. In a second step, a location of the light sheet plane along the optical imaging axis is set, wherein a plurality of images of the sample are recorded with different locations of the light sheet plane along the optical imaging axis, with the result that a z-stack consisting of a plurality of images of the sample is obtained.

DE 10257423 A1 describes a microscope in which a sample is illuminated by a thin light stripe and the observation takes place perpendicularly to the plane of the light stripe. The light stripe is moved for the image recording, and fluorescence or/and stray light is recorded with a two-dimensional detector. Further publications relating to light-field microscopy are DE 10 2007 063 274 A1, DE 10 2013 107 298 A1, DE 10 2013 112 596 A1, US 2013/0286 181 A1, DE 10 2016 103 182 A1, and WO 2010/012980 A1.

SUMMARY

Proceeding from this, a light sheet microscope and a method of light sheet microscopy are to be provided, which reduces the photonic sample exposure and increases the detection speed.

The invention is defined in the independent claims. Advantageous developments are specified in the dependent claims. The preferred embodiments in the same way apply to the light sheet microscope and to the method.

A light sheet microscope and a method for light sheet microscopy are provided.

The light sheet microscope comprises a sample volume with a sample stage for a sample carrier with a sample and an optical detection device for imaging the sample volume along an optical imaging axis. The light sheet microscope furthermore comprises an illumination device for illuminating the sample with a light sheet. The light sheet is characterized by a light sheet plane that is adjustable in the sample volume and in which an illumination axis of the illumination unit is located. The light sheet plane of the light sheet lies substantially perpendicularly to the optical imaging axis and has an illumination width b perpendicularly to the light sheet plane. The light sheet microscope furthermore comprises a processing device, which is connected both to the optical detection device and also to the illumination device and/or the sample stage. The processing device controls the illumination device and/or the sample stage for setting the location of the light sheet plane in the sample volume, wherein the processing device is configured to control the optical detection device to record a plurality of images of the sample volume with different locations of the light sheet plane, with the result that a z-stack consisting of a plurality of images of the sample volume with the sample, which is located therein, is produced. Such an arrangement in the light sheet microscope makes image recording of specific, individual sample planes located within the sample in the sample volume possible, without the need to mechanically cut up the sample.

The light sheet is generated for example using a cylindrical optical unit or by scanning a laser beam. Owing to the illumination with the light sheet, only dyes of the sample in the light sheet plane that in embodiments corresponds to individual sample planes are excited in a targeted manner. This excitation generates fluorescent radiation from the light sheet plane. The fluorescent radiation of the light sheet plane is detected by a focal plane of the optical detection device, that is to say the plane into which the optical detection device is focused (in which the focal point of the optical detection device is located), being generated in the light sheet plane. The focal plane can also deviate axially along the optical imaging axis from the light sheet plane, but must be located within the light sheet.

The processing device is configured such that it controls the illumination device and/or the sample stage to displace the light sheet plane and the focal plane of the imaging in the sample volume such that both are moved step-by-step through the sample volume and thus through the sample and the sample is thereby scanned step-by-step. Such a displacement of the light sheet plane and of the focal plane can be realized by a displacement of the sample itself, for example by displacing the sample stage with the aid of the drive, or the sample remains in its fixed position and the illumination device is moved in relation to the sample.

Depending on the embodiment, the displacement of the light sheet plane in the sample volume is coupled or automatically connected to a displacement of the focal plane in the sample volume in the same direction such that the focal plane is always located within the light sheet.

The processing device is furthermore configured such that it controls the detection device after every displacement of the light sheet plane. In this way, a plurality of images of individual sample planes are recorded step-by-step, wherein the light sheet plane and the focal plane in each image are in a different location in relation to the sample. A stack is produced, the images of which come from different depths along the imaging axis. This results in a spacing a between the locations of the light sheet plane of axially successive images of the stack. This spacing, measured along the optical imaging axis, must always be greater than/equal to half the illumination width b, likewise measured along the optical imaging axis, but must not be greater than the illumination width b. The light sheets in the individual images recorded with adjacent locations of the light sheet plane in this case overlap. The pair-wise overlap that is thus produced ensures that all sample regions are exposed at least once, although for image recording purposes, only the regions of the sample in the sample volume that are also detected are always illuminated with the light sheet. The light sheet thickness is preferably 0.5 to 10 µm, and the stack of samples of, for example, millimeter size is thus composed of more than a thousand images.

What is ultimately important for the imaging is the relative movement of the sample volume with respect to the detection device. This relative movement can be realized by different scanning principles. One known principle is the displacement of the detection device (and of the light sheet illumination device that is coupled thereto and is generally emitting light perpendicularly thereto) along the optical axis of the imaging. This direction is typically referred to as the z-direction in microscopy and constitutes an axial direction with respect to the imaging. Where axial is mentioned herebelow, it refers to the imaging, that is to say it denotes a depth direction of the imaging. In conventional microscopy, this is the z-axis. If the unit of detection and illumination is displaced along the optical axis of the imaging, the corresponding result is an image stack, the images of which are located one behind the other in the z-direction. An alternative of this is known from DE 10 2013 107 297 A1. In that document, the illumination axis and the detection axis are likewise substantially perpendicular, and scanning is realized in that the sample is displaced in a plane that contains neither the illumination axis nor the imaging axis. This, too, ensures that different depth regions in the sample volume are equally scanned and a stack of images is produced. However, the images in that case are not only arranged spaced apart along the optical imaging axis, that is to say in the conventional z-direction, but are at the same time also laterally shifted with respect to one another with respect to the imaging axis. This shift can be compensated for by simply displacing the individual images backward. The backward displacement compensates for the lateral shift (transversely to the imaging axis) caused by the angle between the plane in which the sample is displaced and the illumination axis (or the perpendicular on the imaging axis). The technical solution explained here can be realized with both variants. Where the second of the variants is explained below, this is merely an example.

The processing device is configured to compute intermediate images for the stack that correspond to images that would have been recorded with virtual locations of the light sheet plane. As a result, the number of the images required for imaging the sample is reduced, wherein the stack is recorded with a number of images that by itself is not sufficient to image the sample in a high quality. In order to nevertheless produce a high quality of the imaging of the sample, the intermediate images for the stack are mathematically reconstructed. Each image of the stack represents a projection according to a point spread function (PSF) along the optical imaging axis. This means that each image of the stack contains image information originating from different, axially spaced-apart sample planes. Due to the overlap, it is possible to mathematically reconstruct from this image information the intermediate images. This is known for example from DE 10 2018 009 056 A1. In that document, a stack of individual images is likewise reconstructed, wherein additional intermediate images are generated so as to proceed with fewer individual images than was typical previously; in particular, it is possible to fall below the requirement that results from the Nyquist theorem. This publication does not relate to light sheet microscopy, but the mathematical computation that is used there for individual images stacked in the depth direction is preferably and advantageously also and especially applicable to the light sheet microscopy described here. Reference is made in particular to paragraphs [0006], [0014]-[0017] and [0073] of the publication.

Due to the reduced number of the images of the stack, the photonic exposure of the sample is significantly reduced. In addition, the speed of the recording of the stack is increased, preferably by the factor 3, with respect to recording without reconstruction of the intermediate images. By reconstructing the intermediate images, the quality of the imaging of the sample still remains high.

The quality of the reconstruction can preferably be improved in that the illumination is structured in the axial direction, that is to say along the optical imaging axis, during the image recording of the stack. Measures and setups that are suitable herefor are known from DE 10 2018 207 821 A1, the disclosure content of which is here incorporated in its entirety. As a result, planes projected within the point spread function have a lesser contribution.

The method of the light sheet microscopy proceeds in three steps. In a first step, the sample is illuminated with a light sheet that is characterized by a light sheet plane, wherein the light sheet plane is arranged substantially perpendicularly to an optical imaging axis and the light sheet has an illumination width b perpendicular to the light sheet plane. In a second step, the location of the light sheet plane in the sample is set. Here, a plurality of images of the sample with different locations of the light sheet plane and the focal plane in the sample are recorded, with the result that a stack consisting of a plurality of images of the sample from different depth regions of the sample is produced. Two successive locations of the light sheet plane have between them a spacing a, which is greater than/equal to half the illumination width b, but is not greater than the illumination width b—measured in each case along the optical imaging axis. In a third step, intermediate images for the stack that correspond to images of virtual locations of the light sheet plane in the sample volume are computed.

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

DETAILED DESCRIPTION

Figure 1:
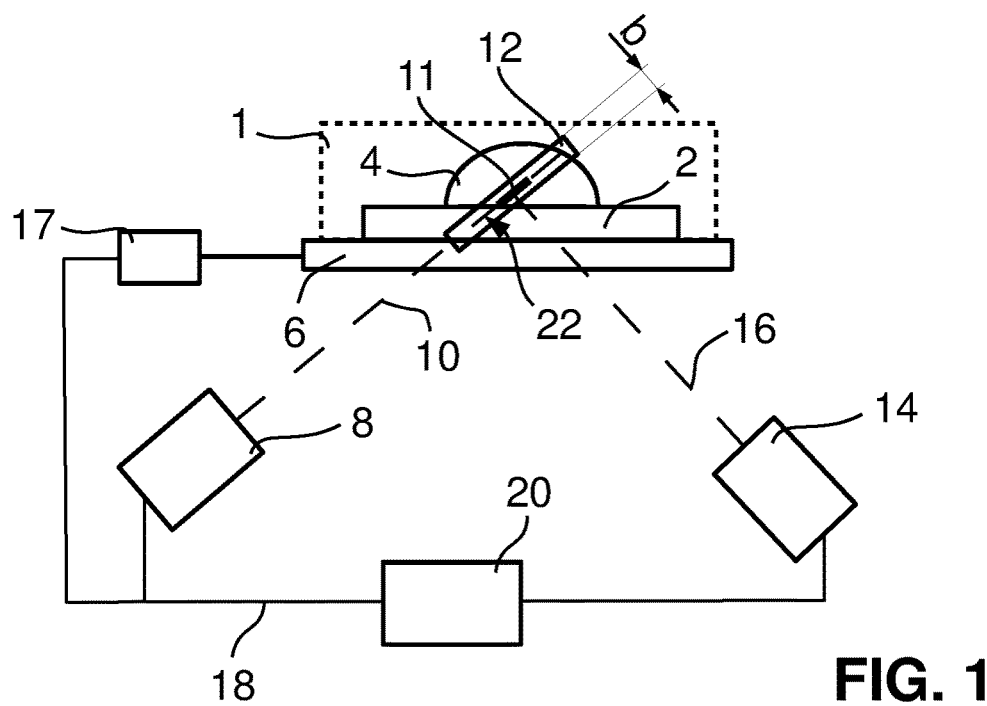
FIG. 1 shows a light sheet microscope.

FIG. 1 illustrates a light sheet microscope capturing a sample volume 1 with a sample stage 6 for a sample carrier 2 with a sample 4. The sample 4 is illuminated with a light sheet 12 using an illumination device 8, characterized by an illumination axis 10. The light sheet 12 is characterized by a light sheet plane in a first location 22 and has an illumination width b perpendicular to the light sheet plane. An optical imaging axis 16 of an optical detection device 14 is arranged perpendicular to the light sheet plane in the first location 22. The optical detection device 14 is focused into a focal plane 11. In this embodiment, this focal plane 11 lies exactly on the light sheet plane, but it can also lie outside of the light sheet plane, provided it is located within the light sheet 12. This precondition must also be observed in the subsequent displacement.

The sample stage 6 is driven by a drive 17 such that the position of the sample stage 6 and thus of the sample carrier 2, located thereon, with the sample 4 is settable relative to the illumination device 8 and synchronously also relative to the detection device 14. In this way, the light sheet 12 and the focal plane 11 are synchronously displaced in the sample 4 by means of the drive. The locations of the light sheet 12 and the focal plane 11 in this case remain constant.

The illumination device 8, the optical detection device 14, and the drive 17 are connected to a processing device 20 via electrical lines 18. This is one example of a connection, and other data-communication connections, such as radio or the like, are also possible.

Alternatively, it would also be possible (not shown) to leave the sample 4 in its position and to either locate the drive 17 at the illumination device 8 in order to move the illumination device and thus the light sheet 12 relative to the sample 4, or to displace the light sheet by way of an optical adjustment, for example with a scanner, along the optical imaging axis 16. The focal plane 11 is then also adjusted otherwise in the same sense and synchronously, for example by refocusing or moving the detection device 14.

Figure 2A:
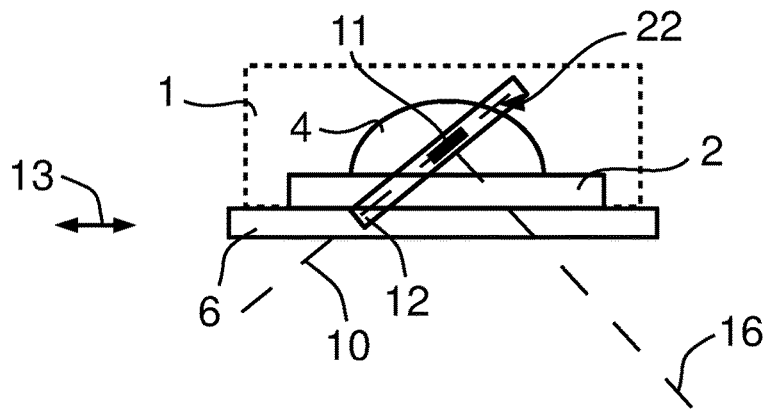
FIG. 2A shows illumination of a sample with a light sheet in a first position.
Figure 2B:
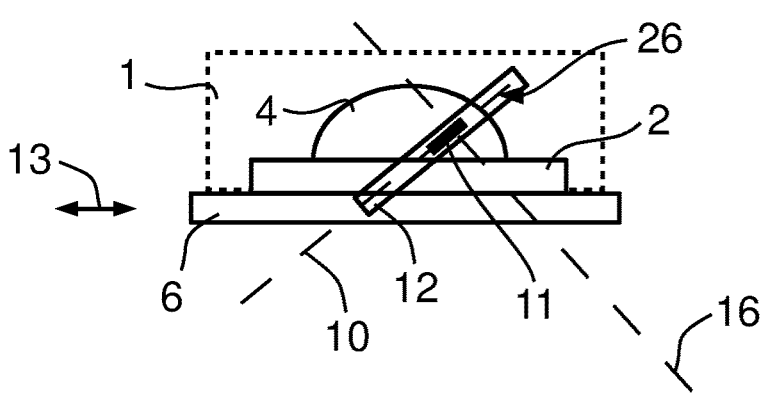
FIG. 2B shows illumination of a sample with a light sheet in a second position.

FIGS. 2A and 2B show the arrangement according to FIG. 1, wherein the view of the sample volume 1 with the sample stage 6, the sample carrier 2, and the sample 4 is illustrated in detail, and the sample stage 6 with the sample carrier 2 and the sample 4 within the sample volume 1 is in FIG. 2B displaced along the movement axis 13 compared with FIG. 2A.

The processing device 20 controls the illumination device 8 to illuminate the sample 4 with the light sheet 12. The light sheet plane is defined thereby in the first location 22 in the sample 4. The light sheet 12 is generated for example using a cylindrical optical unit or by scanning a laser beam. Owing to the illumination with the light sheet 12, only dyes of the sample 4 located in the light sheet plane are excited, as a result of which fluorescent radiation from the light sheet plane is generated.

In order to detect this fluorescent radiation, the optical detection apparatus 14 is provided. The processing device 20 controls the optical detection device 14, for example a camera of the detection device, such that an image is generated from the focal plane 11 located perpendicularly to the optical imaging axis 16. In embodiments, the focal plane 11 is located in the light sheet plane but can also be shifted along the imaging axis 16 parallel to the light sheet plane; however, it is located within the light sheet 12 in any event. The optical detection device 14 is focused into the focal plane 11 and detects the fluorescent radiation that is emitted from the light sheet plane illuminated with the light sheet 12. Owing to the arrangement according to FIG. 1, the recording of individual sample planes with a fixed relative position of light sheet 12 and focal plane 11 in the light sheet microscope becomes possible by a simple lateral displacement of the sample 4.

The light sheet 12 and the focal plane 11 are synchronously adjusted in the sample volume 1. In FIGS. 2A and 2B, two locations 22 and 26 for the synchronous displacement of light sheet 12 and focal plane 11 in the sample volume 1 are illustrated.

In the different locations 22, 26 of the light sheet plane, different sample planes in the sample 4 are illuminated with the light sheet 12 and imaged from the focal plane 11 (not shown). The processing device 20, which performs the location setting (e.g. via the drive 17) of the optical detection device 14, in this way generates a stack comprising a plurality of images of the sample 4, wherein each image lies with a different location 22, 26 of the light sheet plane and the focal plane 11.

Figure 2C:
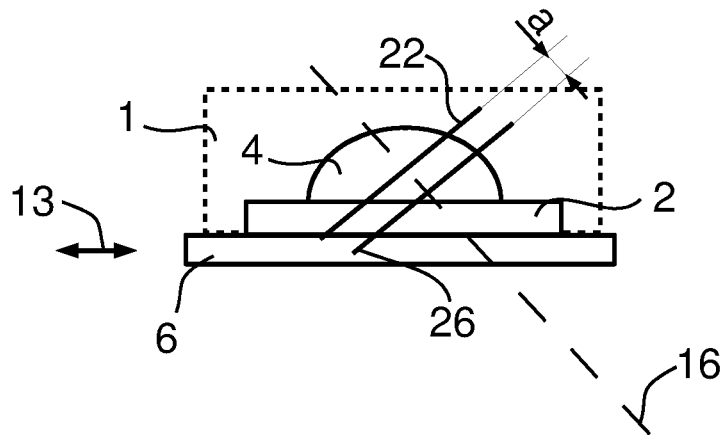
FIG. 2C and FIG. 2D show illumination of a sample with a light sheet in a first position and a light sheet in a second position.

FIG. 2C shows the same setup as FIGS. 2A and 2B, but the light sheet 12 is no longer illustrated but merely the light sheet plane in the first location 22 and in the second location 26. FIG. 2C illustrates the locations 22, 26, shown in FIGS. 2A and 2B, of the light sheet planes in one image; the focal plane is not shown for simplification purposes. Due to this illustration, a spacing a can be seen, which comes about between the light sheet plane in the first location 22 and in the second location 26 if a first image of the stack is recorded upon illumination of the sample 4 with the light sheet 12 in the first location 22 and a second image of the stack is recorded upon illumination of the sample 4 with the light sheet in the second location 26.

Figure 2D:
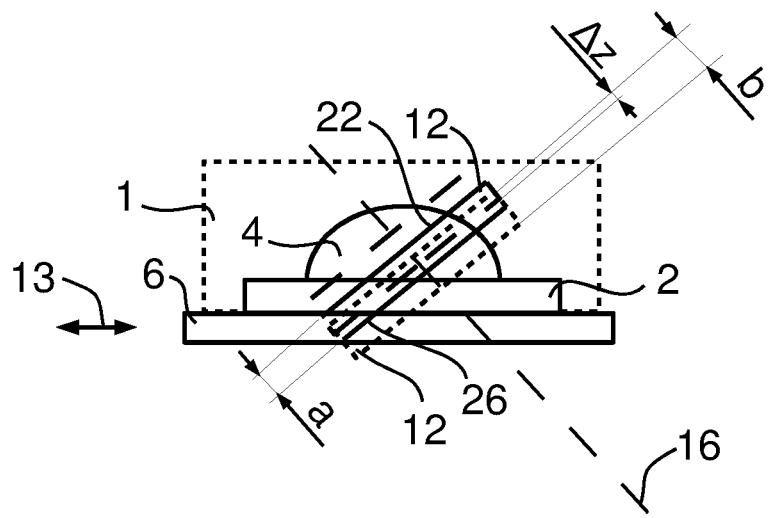

FIG. 2D shows, in addition to FIG. 2C, the light sheet 12 in both locations 22, 26. An overlap $\Delta z$ and the illumination width b of the light sheet 12 can be seen. Both values are measured along the optical imaging axis.

The processing device 20 controls the illumination device 8 and/or the sample stage 6 in a manner such that a spacing a between the locations of the light sheet plane of images of the stack, which are recorded successively, along the optical imaging axis is produced. This spacing a is greater than/equal to half the illumination width b, but not greater than the illumination width b (cf. FIG. 2D). In this way, the overlap $\Delta z$ between the sample volumes that correspond to the light sheet 12 with the light sheet plane in the first location 22 and to the light sheet 12 with the light sheet plane in the second location 26 is produced, which ensures that all regions of the sample 4 are exposed at least once.

The processing device 20 is furthermore configured to compute intermediate images for the stack, which correspond to images during the illumination with the light sheet 12 with the light sheet plane in a virtual location. Owing to this computation of the intermediate images with the processing device 20, it becomes possible for the number of the images with which the stack is recorded in order to record the sample 4 with a high quality to be able to be reduced in a targeted manner. The sample can thus be stressed less and at the same time the recording speed can be increased without significantly deteriorating the imaging quality. The mathematical reconstruction of the intermediate images becomes possible in that each image of the stack presents a projection according to a point spread function (PSF) along the optical imaging axis 16. In respect of the reconstruction, reference is made again to DE 10 2018 009 056 A1.

If the illumination is structured axially (i.e. along the imaging axis) during the image recording, the quality of the reconstruction of the virtual locations of the light sheet planes can be improved because planes projected within the PSF have a lesser contribution. DE 10 2018 009 056 A1 describes possible measures in this respect, in particular an asymmetry in the light sheet illumination. It is with particular preference realized by the different locations of the light sheet, as already described. The axial structuring is known from DE 10 2018 207 821 A1, which has likewise already been mentioned in the introductory part.

Figure 3:
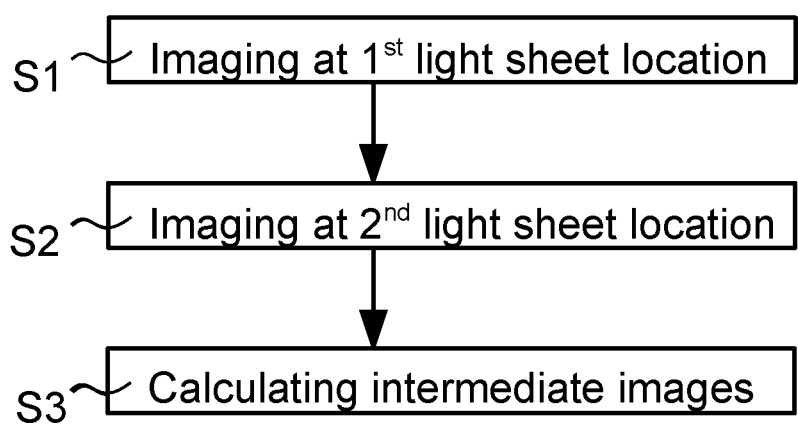
FIG. 3 shows a flowchart for the method for light sheet microscopy.

FIG. 3 shows a flowchart for a method for light sheet microscopy. In a first step S1, the sample 4 is illuminated with the light sheet 12, which is characterized by a light sheet plane in a first location 22. The light sheet plane in the first location 22 is located in the illumination axis 8, wherein the light sheet plane is arranged substantially perpendicularly to the optical imaging axis 16 and the light sheet 12 has an illumination width b perpendicular to the light sheet plane. In a second step S2, the light sheet plane in the sample volume is adjusted to a second location 26. An image of the sample 4 is recorded both in the first location 22 and also in the second location 26 of the light sheet plane, wherein a focal plane 11 of the imaging is always located in the light sheet. In this way, a stack consisting of a plurality of images of the sample 4 is recorded with the illumination with light sheets 12 in different locations of light sheet plane and focal plane in the sample. Here, the spacing a, measured along the optical imaging axis 16, between successive locations of the light sheet plane in the images of the stack is established to be greater than/equal to half the illumination width b, but not greater than the illumination width b. In a third step S3, the intermediate images for the stack are computed.

What is claimed is:

1. A light sheet microscope, comprising:
    a sample volume, including a sample stage for a sample carrier with a sample;
    a detection device comprising a camera that images the sample volume along an optical imaging axis;
    an illumination device comprising cylindrical optics or a scanned laser beam which illumination device illuminates the sample with a light sheet, comprising a light sheet plane that is adjustable in the sample volume, wherein the light sheet plane is arranged substantially perpendicularly to the optical imaging axis and the light sheet has an illumination width extending perpendicular to the light sheet plane; and
    a processing device comprising a computing unit and a wired or wireless, connection to the detection device and further to the illumination device or to the sample stage or to both, wherein the processing device is configured to:
        control the illumination device or the sample stage or both to set a location of the light sheet plane sequentially to different locations of the light sheet plane of the light sheet in the sample volume,
        control the detection device to record an image of the sample volume for each of the different locations of the light sheet plane, whereby a stack of a plurality of images of the sample volume is produced, with each image in the stack corresponding to a single one of the different locations of the light sheet plane,
        control the illumination device or the sample stage or both such that for the plurality of images recorded a spacing, which is measured along the optical imaging axis, between adjacent locations of the different locations of the light sheet plane is greater than or equal to half the illumination width, but not greater than the illumination width, and
        compute intermediate images for the stack, each of the intermediate images corresponding to a virtual additional location of the light sheet plane in the sample volume.

2. The light sheet microscope as claimed in claim 1, wherein the processing device is further configured to control the illumination device to provide the illumination structured along the optical imaging axis during the producing of the stack.

3. The light sheet microscope as claimed in claim 1, wherein the camera has a field of view and the processing device is further configured to control the illumination device and the detection device to illuminate only regions of the sample volume that are in the field of view.

4. A method for light sheet microscopy, comprising:
    illuminating a sample with a light sheet comprising a light sheet plane, wherein the light sheet plane is arranged substantially perpendicularly to an optical imaging axis and the light sheet has an illumination width extending perpendicular to the light sheet plane;
    setting the light sheet plane sequentially to different locations of the light sheet plane of the light sheet in the sample;
    recording an image of the sample for each of the different locations of the light sheet plane, thereby producing a stack comprising of a plurality of images of the sample, with each image in the stack corresponding to a single one of the different locations of the light sheet plane, wherein a spacing, measured along the optical imaging axis, between adjacent locations of the different locations of the light sheet plane is greater than or equal to half the illumination width, but not greater than the illumination width; and
    computing intermediate images, each of the intermediate images corresponding to a virtual additional location of the light sheet plane in the sample.

5. The method for light sheet microscopy as claimed in claim 4, wherein the illumination is structured along the optical imaging axis during the producing of the stack.

6. The method for light sheet microscopy as claimed in claim 4, wherein only the regions of the sample volume that are detected are illuminated.

7. A light sheet microscope, comprising:
    a sample volume, comprising a sample stage for a sample carrier with a sample;
    a detector that images the sample volume along an optical imaging axis;

an illumination source that illuminates the sample with a light sheet, comprising a light sheet plane that is adjustable in the sample volume, wherein the light sheet plane is arranged substantially perpendicularly to the optical imaging axis, and wherein the light sheet has an illumination width extending perpendicular to the light sheet plane; and a processor, which is connected to the detector, and is connected to the illumination source or to the sample stage or to both, wherein the processor is configured to:

control the illumination source or the sample stage, or both, to set a location of the light sheet plane sequentially to different locations of the light sheet plane of the light sheet in the sample volume, control the detector to record an image of the sample volume for each of the different locations of the light sheet plane, whereby a stack of a plurality of images of the sample volume is produced, with each image in the stack corresponding to a single one of the different locations of the light sheet plane, control the illumination source or the sample stage, or both, such that for the plurality of images recorded a spacing, which is measured along the optical imaging axis, between adjacent locations of the different locations of the light sheet plane is greater than or equal to half the illumination width, but not greater than the illumination width, and compute intermediate images for the stack, each of the intermediate images corresponding to a virtual additional location of the light sheet plane in the sample volume.

8. The light sheet microscope as claimed in claim 7, wherein the processor is further configured to control the illumination source to provide the illumination structured along the optical imaging axis during the producing of the stack.

9. The light sheet microscope as claimed in claim 7, wherein the processor is further configured to control the illumination source and the detector to illuminate at each of the different locations of the light sheet plane only regions of the sample volume for which the image is being recorded.

* * * * *